(12) United States Patent
Ferrer Beltran

(10) Patent No.: US 10,215,294 B2
(45) Date of Patent: Feb. 26, 2019

(54) THREE-WAY VALVE STRUCTURE

(71) Applicant: Valvulas Arco, S.L., Foios (ES)

(72) Inventor: Jose Maria Ferrer Beltran, Foios (ES)

(73) Assignee: VALVULAS ARCO, S.L., Foios (Valencia) (ES)

( * ) Notice: Subject to any disclaimer, the term of this patent is extended or adjusted under 35 U.S.C. 154(b) by 0 days.

(21) Appl. No.: 14/773,662

(22) PCT Filed: May 8, 2013

(86) PCT No.: PCT/ES2013/070289
§ 371 (c)(1),
(2) Date: Sep. 8, 2015

(87) PCT Pub. No.: WO2014/135718
PCT Pub. Date: Sep. 12, 2014

(65) Prior Publication Data
US 2016/0033050 A1    Feb. 4, 2016

(30) Foreign Application Priority Data
Mar. 8, 2013 (ES) .................... 201330331

(51) Int. Cl.
*F16K 11/087* (2006.01)
*F16K 35/04* (2006.01)
(Continued)

(52) U.S. Cl.
CPC ........ *F16K 11/0876* (2013.01); *F16K 5/0414* (2013.01); *F16K 5/0492* (2013.01);
(Continued)

(58) Field of Classification Search
CPC ..... Y10T 137/86863; Y10T 137/86871; F16K 11/08; F16K 11/085; F16K 11/087;
(Continued)

(56) References Cited

U.S. PATENT DOCUMENTS 413,923 A * 10/1889 Blanchard ........... F16K 37/0008
116/277
596,871 A * 1/1898 Grist ................... F16K 37/0016
137/556.6
(Continued)

FOREIGN PATENT DOCUMENTS

CZ         9454 U1   12/1999
EP     0478930 A2 *  4/1992  ............... A01K 9/00
(Continued)

*Primary Examiner* — Reinaldo Sanchez-Medina
*Assistant Examiner* — David Colon Morales
(74) *Attorney, Agent, or Firm* — Hayes Soloway PC

(57) ABSTRACT

The invention relates to an improved three-way valve structure consisting of a main three-way valve body (1) with inlet (2) and outlet channels (3, 4) that communicate internally by means of an inner obturator element (5) actuated by a key (27), characterized by the relative position of the outlet channels which are perpendicularly arranged in relation to each other and in the same plane perpendicular to the inlet channel, the exterior form of the obturator (5) being a surrounding cylindrical shape and provided with, in the upper part thereof, flanges (9) for the seating of the same and sealing joints (12, 13), ending in a projecting rod (15) with a key seat shape that can fit into the key (27) of the valve. The key enables four functional positions by means of a quarter-circle turn: both outlets open, one outlet open and another closed and both outlets closed.

7 Claims, 8 Drawing Sheets

Figure 1:
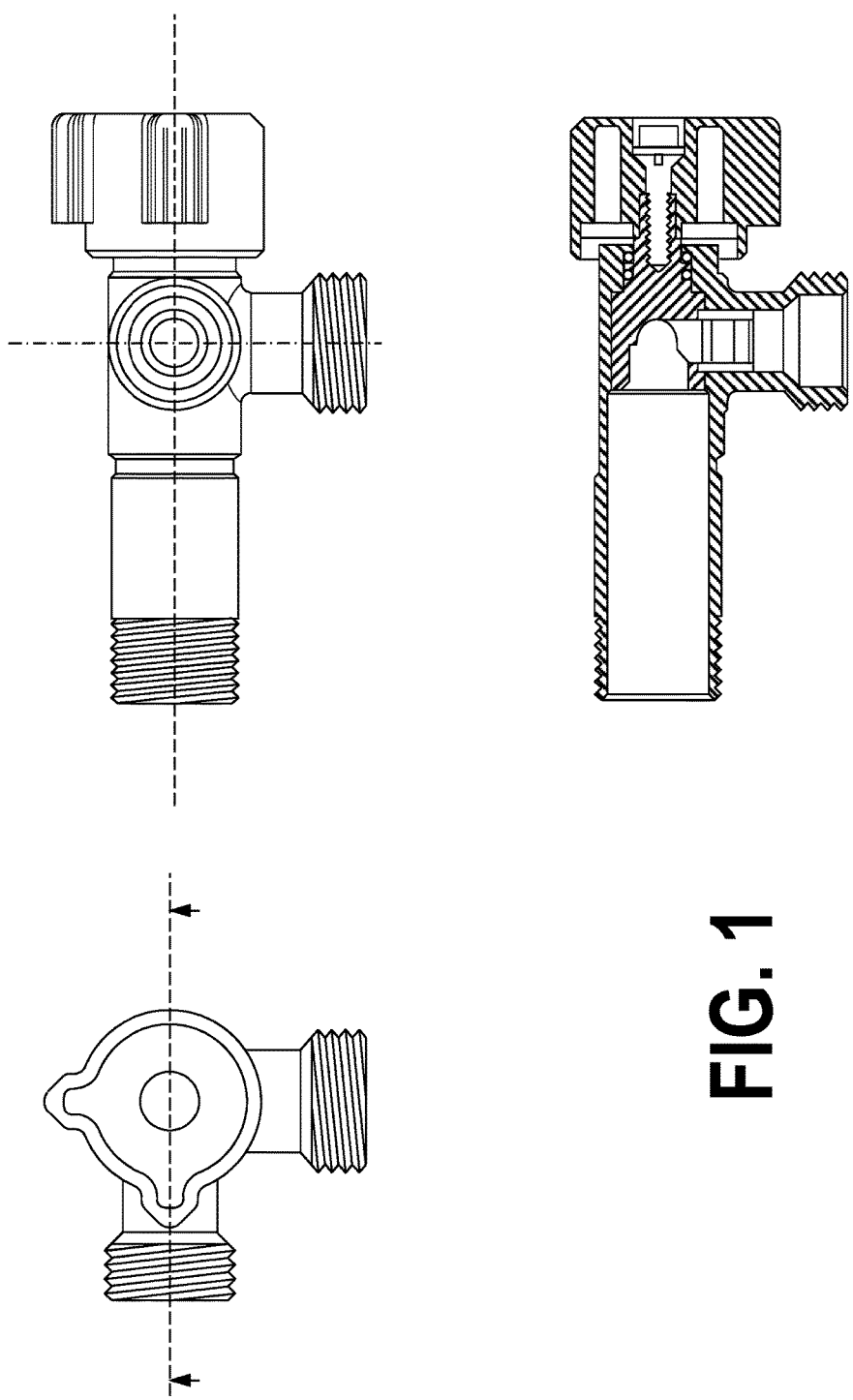

(51) Int. Cl.
*F16K 27/06* (2006.01)
*F16K 5/04* (2006.01)
*F16K 11/085* (2006.01)
*F16K 5/06* (2006.01)

(52) U.S. Cl.
CPC .......... *F16K 5/0642* (2013.01); *F16K 11/085* (2013.01); *F16K 27/067* (2013.01); *F16K 35/04* (2013.01)

(58) Field of Classification Search
CPC ...... F16K 5/0414; F16K 27/06; F16K 27/065; F16K 27/067; F16K 37/00; F16K 37/0008; F16K 37/0016; F16K 35/04
USPC ......... 137/551–559, 315.17, 315.15, 315.18, 137/315.25, 315.26; 251/89–116; 74/548, 543; 16/110.1
See application file for complete search history.

(56) References Cited

U.S. PATENT DOCUMENTS

| | | | | |
|---|---|---|---|---|
| 1,244,630 A * | 10/1917 | Mitchel | ............... | F16K 37/0008 137/556.3 |
| 2,179,684 A * | 11/1939 | Brown | .................... | F16K 5/162 251/163 |
| 2,572,507 A | 10/1951 | Mueller | | |
| 2,854,027 A | 9/1958 | Kaiser et al. | | |
| 3,096,966 A * | 7/1963 | McFarland, Jr. | ..... | F16K 5/0647 251/214 |
| 3,115,896 A * | 12/1963 | Roberts | ................. | F16K 11/085 137/556.6 |
| 3,192,948 A * | 7/1965 | Anderson | ............. | F16K 5/0689 137/454.6 |
| 3,308,850 A * | 3/1967 | Gill | ........................ | F16K 1/301 137/271 |
| 3,536,100 A * | 10/1970 | Shum, Jr. | .............. | F16K 11/085 137/625.47 |
| 3,699,998 A * | 10/1972 | Baranowski, Jr. | ......................... | G05D 16/0663 137/315.04 |
| 3,938,553 A * | 2/1976 | Ortega | .................. | F16K 11/085 137/625.43 |
| 3,943,959 A | 3/1976 | Kirkland | | |
| 3,957,082 A * | 5/1976 | Fuson | .................. | A61M 5/1408 128/DIG. 26 |
| 4,146,055 A | 3/1979 | Ryder et al. | | |
| 4,275,868 A * | 6/1981 | Crone | ..................... | F16K 5/045 251/310 |
| 4,470,429 A * | 9/1984 | Johnson | ............. | F16K 11/0853 137/270 |
| 4,522,233 A * | 6/1985 | Mojadad | ............... | F16K 11/083 137/625.18 |
| 4,572,239 A * | 2/1986 | Koch | ................... | F16K 11/0873 137/312 |
| 4,577,656 A * | 3/1986 | Beltran | ................. | F16K 5/0414 137/375 |
| 4,635,674 A * | 1/1987 | Bajka | .................... | E04H 4/1209 137/246.22 |
| 4,809,949 A * | 3/1989 | Rakieski | ................ | F16K 5/061 137/382 |
| 4,951,711 A * | 8/1990 | Kunz | ................... | F16K 11/0876 137/625.47 |
| 5,123,449 A * | 6/1992 | Nowicki | ............... | F16K 11/085 137/625.11 |
| 5,695,169 A * | 12/1997 | Higgins | ................ | F16K 5/0414 16/441 |
| 5,735,307 A * | 4/1998 | Charron | ............... | F16K 5/0642 137/270 |
| 5,769,118 A * | 6/1998 | Lenberg | .................. | F16K 31/60 116/277 |
| 5,832,959 A * | 11/1998 | Szymczakowski | ......................... | A61M 39/223 137/556 |
| 5,906,224 A * | 5/1999 | Tupper | ................ | F16K 11/0876 137/625.47 |
| 5,988,220 A * | 11/1999 | Sakaki | ................ | F16K 11/0876 137/625.22 |
| 6,431,520 B1 * | 8/2002 | Ferrer Beltran | ...... | F16K 5/0636 251/288 |
| 6,497,250 B1 * | 12/2002 | Johann | .................. | F16K 11/076 137/625.46 |
| 6,874,824 B2 * | 4/2005 | Anderson | ........... | F16K 11/0876 285/328 |
| 7,036,793 B2 * | 5/2006 | Turnau, III | .......... | F16K 5/0414 251/175 |
| 7,546,851 B2 * | 6/2009 | Wang | .................... | F16K 11/085 137/625.47 |
| 2004/0045613 A1 * | 3/2004 | Hinojosa, Jr. | .......... | A61H 33/60 137/625.47 |
| 2006/0037655 A1 * | 2/2006 | Ferrer Beltran | .... | F16K 11/0876 137/625.46 |
| 2011/0011474 A1 * | 1/2011 | Duncan | ............... | F16K 11/0853 137/625.47 |
| 2011/0198529 A1 * | 8/2011 | Bugatti | ................. | F16K 35/027 251/366 |
| 2013/0048123 A1 | 2/2013 | Chen | | |

FOREIGN PATENT DOCUMENTS

| | | | | |
|---|---|---|---|---|
| EP | 1429063 A1 * | 6/2004 | ............. | F16K 27/06 |
| EP | 2365237 A1 * | 9/2011 | ........... | F16K 5/0636 |
| ES | 251484 U | 10/1980 | | |
| ES | 1039598 | 1/1999 | | |
| ES | 1042078 | 8/1999 | | |
| FR | 2923886 A1 | 5/2009 | | |
| GB | 2078343 A * | 1/1982 | ........... | F16K 5/0414 |
| WO | WO 2006118361 A1 * | 11/2006 | ............ | F16K 11/076 |

* cited by examiner

THREE-WAY VALVE STRUCTURE

The present invention, improved three-way valve structure, consists of a novel three-way valve structure, with an inlet and two outlet channels, arranged at 90° in a plane perpendicular to the first and in which it is changed between each one of the four functional positions by means of a simple quarter-circle turn of the key.

The present invention will be of interest for the valve manufacturing and supply industry in general.

BACKGROUND OF THE INVENTION

With this novel structure, it is intended to provide a solution for a rather frequent need for implementing fluid circuits in which there is an inlet and two outlet channels, wherein, functionally, it is sought to establish four functional positions:
  An outlet open and another closed
  The inverse of the previous position
  The two outlets open
  The two outlets closed Normally, these types of circuits are resolved by means of inserting two or three individual valves in each one of the outlet pipes, connected to the inlet pipe by means of an upstream bifurcation.

This involves, on the one hand, a higher cost since it requires at least two valves, aside from requiring more installation space and more complex handling.

However, the present solution simplifies the entire installation required to a single valve, which also incorporates the bifurcation pipe in two outlet channels. Functionally, this is much simpler, since a quarter-circle turn is sufficient to vary the functional position and it is also provided with exterior signage marks which allow the working position of the valve to be readily visualized. All of which requires a minimum amount of space and an evident saving of installation costs.

Due to all of this, the present structure constitutes a novelty and an advancement of the prior art of these types of fittings.

DESCRIPTION

The present improved three-way valve structure consists, fundamentally, of a three-way valve, one inlet and two outlet, consisting of a main valve body equipped with an inlet channel and two outlet channels.

In the interior thereof, this valve has an obturator element actuated by means of a key or exterior control, the cited inlet channel being capable of communicating internally with the outlet channels.

In this structure, the outlet channels referred to are arranged perpendicular to each other, both outlet channels being in the same plane perpendicular to the cited inlet channel, while the obturator element referred to has a surrounding cylindrical shape and is housed in the interior of the valve body. This obturator element is introduced through the inlet channel fitting into the interior of the valve body.

In addition, the interior structure of the obturator element comprises a longitudinal channel from a lower inlet at the base thereof to an upper bifurcation with two transversal outlet openings, both arranged perpendicularly at 90° and in a plane perpendicular to the inlet channel.

At the exterior part thereof, the obturator element is provided, in upper part thereof, with a flange protruding around the same which upon being introduced into the interior of the valve body, is fitted in an interior recess of similar dimensions arranged on the interior structure of said body of the valve. Two grooves are also located on the exterior surface of the obturator which form the housing of two sealing joints arranged consecutively. Lastly, the obturator elements ends at the upper end thereof in a protruding rod with a key seat shape that can fit in the key or control of the valve.

The structure defined in this way can enable four functional positions of the valve, established by the connection implemented between the inlet channel and the outlet channels. These positions functionally correspond to:
  Both outlets open
  Two positions with only one outlet open and another closed
  A final position with both outlets closed The change between each one of these functional positions is carried out by means of a quarter-circle turn of the key or control of the valve.

The structure described also has two sealing joints inserted in the interior of each one of the outlet channels. These joints are, working under pressure, against the exterior surface of the obturator element, pushed by both retaining clips which are immovable in a radial slot formed into the interior of each one of the outlet channels.

In addition, the valve body ends in a flat face in the upper part thereof, on the surface of which are four indentations distributed crosswise at 90° to each other, on which a positioning washer of the valve key is supported, the latter being a flat shape with at least two diametrically opposing projections and being capable of fitting in the aforementioned indentations by means of a flexible joining, the shape of the central hole of the positioning washer matching the exterior shape of the key seat of the rod of the obturator element.

The key or control of the valve also adopts, in the lower part thereof, the shape of a cavity which matches, in the housing thereof, the key seat shape of the rod of the obturator element.

Lastly, the valve key or control is provided in turn with at least two projections distributed at 90° over the exterior surface thereof for visual identification of the functional, open or closed position of the valve in the different positions thereof.

PREFERRED EMBODIMENT OF THE INVENTION

A detailed description of the improved three-way valve structure, object of the invention, is given below with reference to the drawings which are enclosed, in which, merely by way of example and in a non-limiting manner, a preferred embodiment is represented capable of any variations in detail which do not involve a fundamental alteration of the essential characteristics of said improvements.

Figure 2:
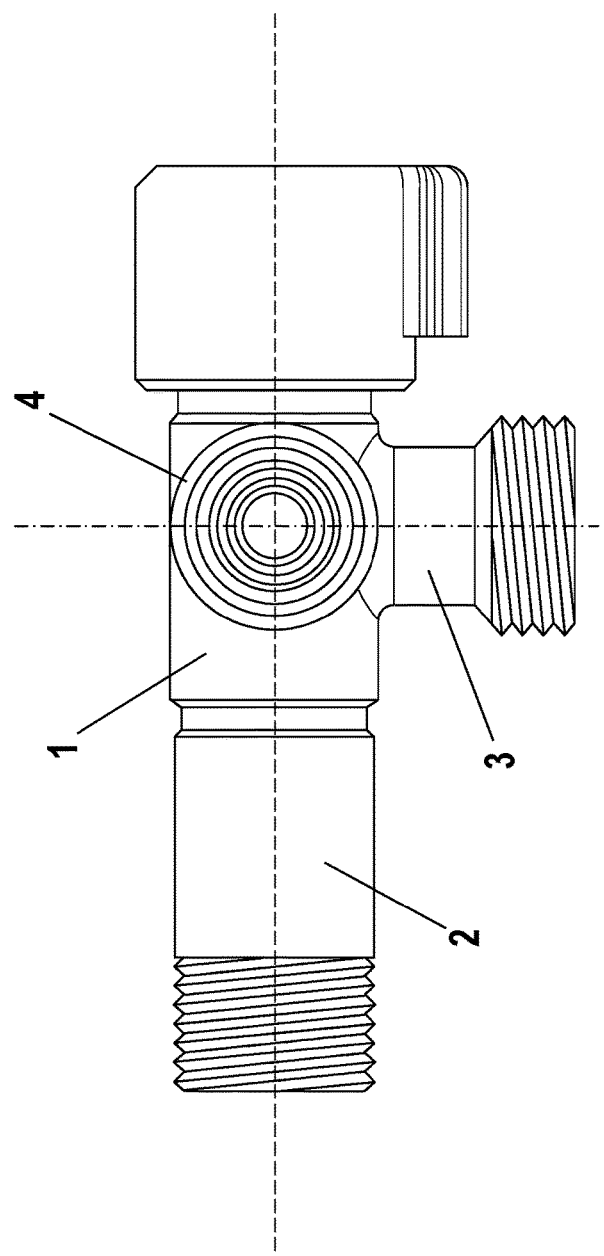
Figure 3:
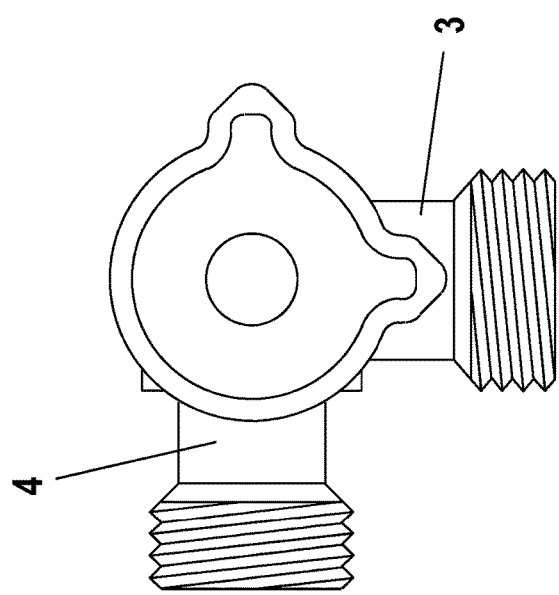
Figure 4:
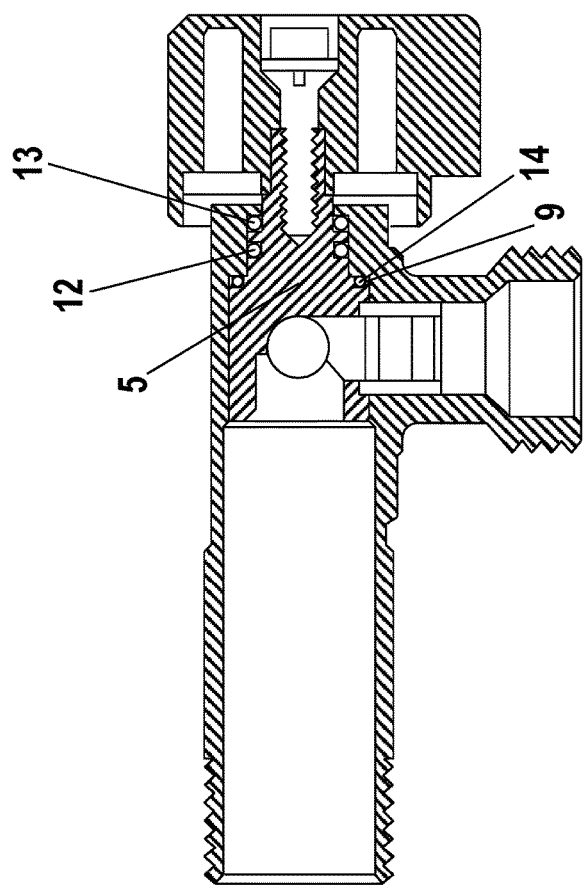

In said plans, the following is shown:
In FIG. 1: Views of the improved three-way valve structure, in elevation, plan and section.
In FIG. 2: View of the improved three-way valve structure in elevation in which the main exterior elements thereof are indicated.
In FIG. 3: View of the improved three-way valve structure in plan in which the main exterior elements thereof are indicated.
In FIG. 4: View of the improved three-way valve structure in section in which the main interior elements thereof are indicated.

Figure 5:
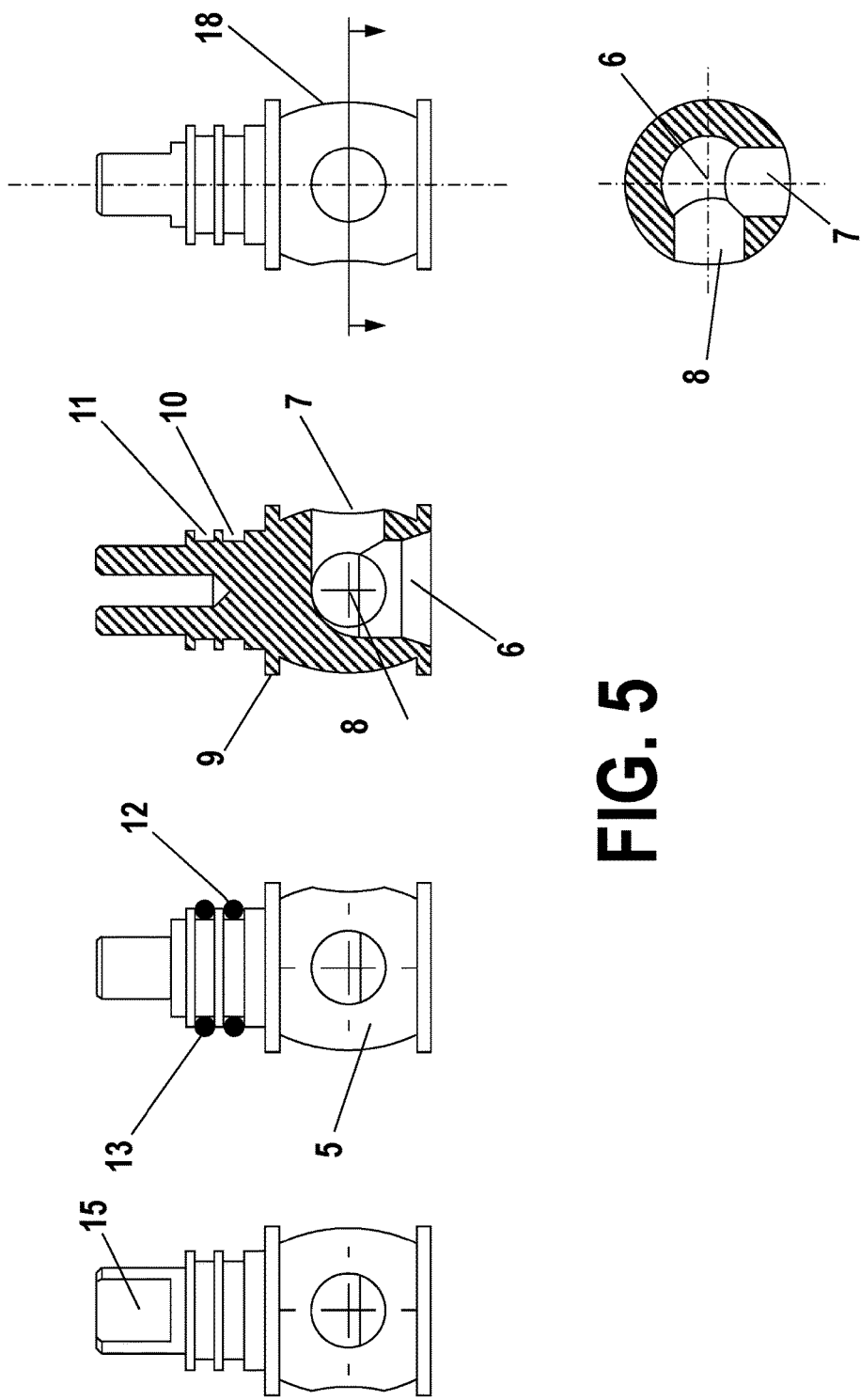

In FIG. 5: View of the interior obturator element of the improved three-way valve structure in different elevations and transversal and longitudinal sections in which the main elements thereof are indicated.

Figure 6:
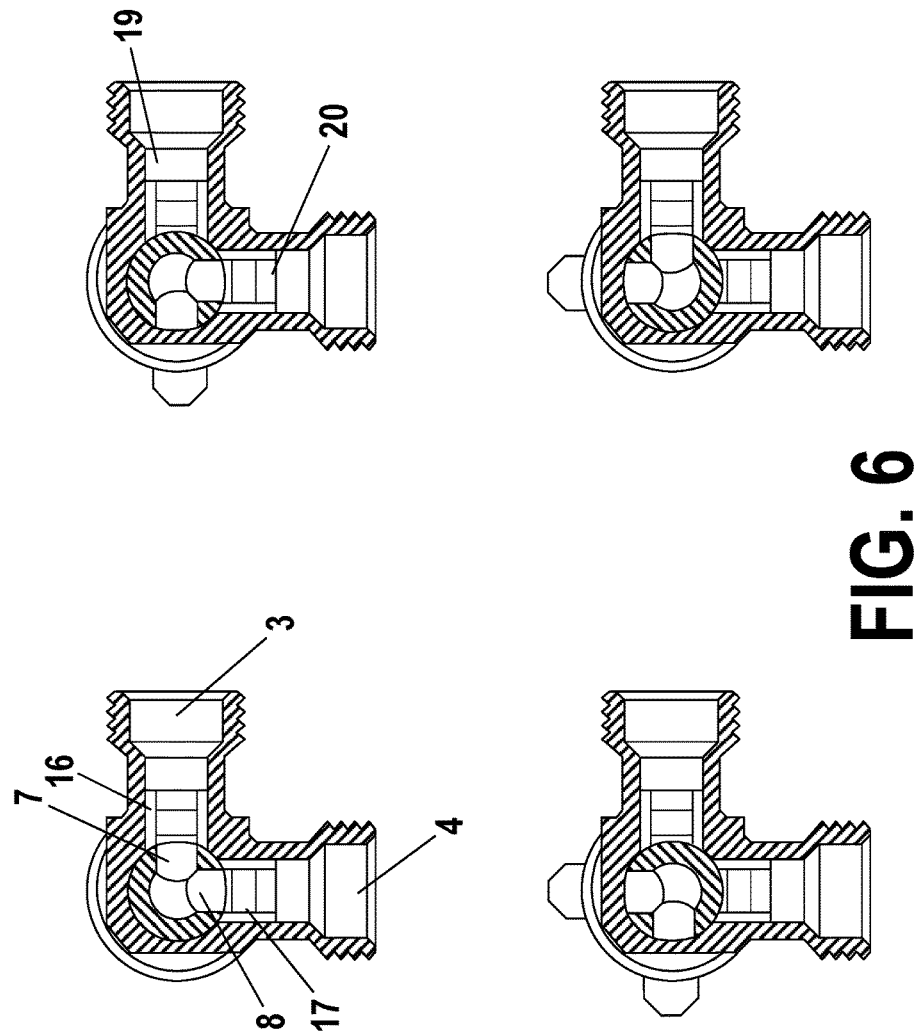

In FIG. 6: Transversal sectional view of the improved three-way valve structure in the four possible turn positions of the obturator element by means of the key or control.

Figure 7:
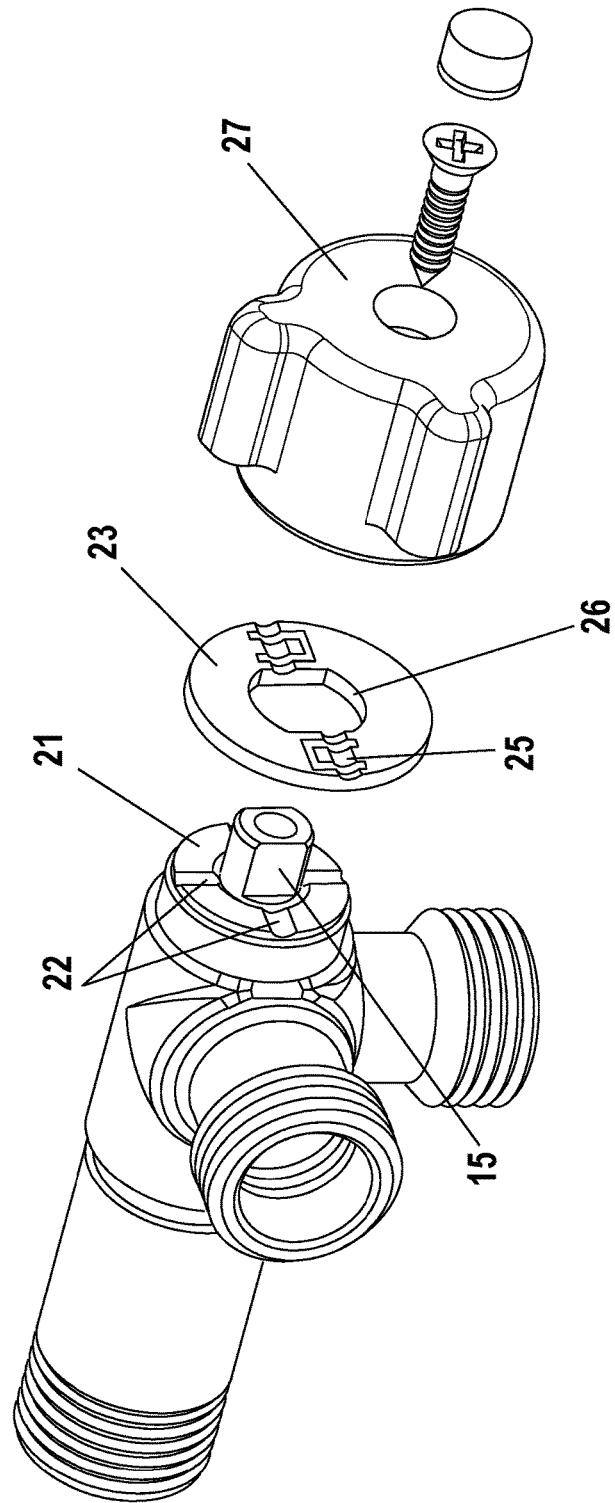

In FIG. 7: Perspective exploded view of the improved three-way valve structure from the side of the key or control.

Figure 8:
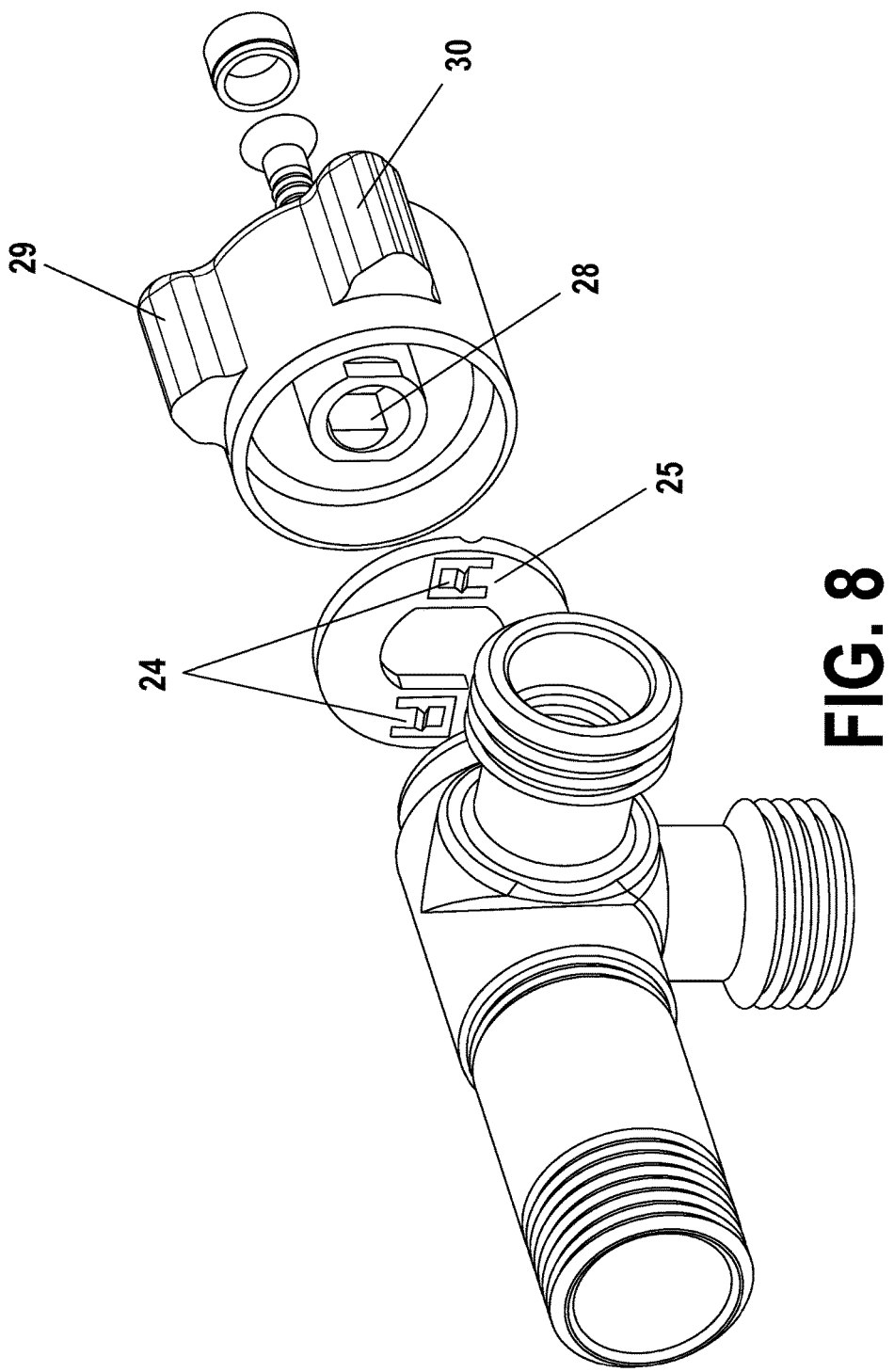

In FIG. 8: Perspective exploded view of the improved three-way valve structure from the side of the inlet mouth.

According to the exemplary embodiment represented, the improved three-way valve structure has a main valve body (1) equipped with an inlet channel (2) and two outlet channels (3) and (4) arranged perpendicular to each other and both outlet channels being in the same plane perpendicular to the cited inlet channel (2).

The distribution between the inlet channel (2) and the outlet channels (3, 4) is implemented internally by means of the obturator element (5) which is housed in the interior of the valve body (1). Said obturator element (5) consists of a body with a surrounding cylindrical shape, through the interior of which runs a longitudinal channel from a lower inlet (6) at the base thereof, communicating, in the upper part thereof, with two transversal outlet openings. A first outlet (7) and a second outlet (8) arranged both perpendicularly at 90° and in a plane perpendicular to the inlet channel.

The obturator element (5), on the exterior part thereof, also has, on the upper part thereof, a stop flange (9) with an interior recess (14) with similar dimensions in the interior of the body of the valve (1) and with two housings (10) and (11) for the insertion of sealing joints (12) and (13), guaranteeing the sealing while the obturator element (5) remains pressed in the interior of the valve body (1). Lastly, the obturator element (5) ends, at the upper end thereof, in a protruding rod (15) for fitting the key or control (27) of the valve which causes it to rotate about the longitudinal axis thereof.

The structure defined in this way allows the turning of the obturator element (5) in the interior of the valve body (1), defining four functional positions of the valve, established by the connection implemented between the inlet channel (2) and the outlet channels (3, 4), as illustrated in FIG. 6.

Both outlets open. The obturator element (5) has the two outlets thereof (7, 8) matching the two outlet channels (3) and (4) of the valve body (1), allowing the flow passage of fluid from the inlet channel (2) by way of the lower inlet of the obturator element (6) towards the two outlet channels (3) and (4) simultaneously.

One outlet open and another closed. The obturator element (5) has the two outlets (7, 8) thereof turned 90° with respect to the two outlet channels (3) and (4) of the valve body (1), allowing only the flow passage of fluid from the inlet channel (2) by way of the lower inlet of the obturator element (6) towards only one of the outlet channels (3 or 4).

Both outlets closed. The obturator element (5) has the two outlets thereof (7, 8) turned 180° with respect to the two outlet channels (3) and (4) of the valve body (1), not allowing the flow passage of fluid from the inlet channel (2) by way of the lower inlet of the obturator element (6) towards any of the two outlet channels (3) and (4).

In addition, in order to achieve internal sealing of the valve between the obturator element (5) and both transversal outlet pipes (3, 4), it has sealing joints (16, 17) inserted in the interior of each one of the cited outlet channels (3, 4) which press against the exterior surface (18) of the obturator element (5). The required pressure which the sealing joint (16, 17) exerts against the exterior surface (18) of the obturator element (5) is achieved when they are retained at the end thereof by means of two retaining clips (19, 20) immovable in a radial slot formed in the interior of each one of the outlet channels (3, 4).

The valve body (1) also ends in a flat face (21) in the upper part thereof, over which four indentations (22) are distributed crosswise at 90° to each other. On said surface, a positioning washer (23) of the valve key (27) is supported which is provided with at least two diametrically opposed projections (24) capable of fitting in the aforementioned indentations (22) by means of a flexible joint (25). The positioning washer (23) and the two projections thereof (24) forms a single piece. The shape of the central hole (26) of the positioning washer (23) also matches the exterior shape of the rod (15) of the obturator element (5), avoiding any turn of the same when it has the shape of straight walls.

In addition, the key or control (27) of the valve adopts, in the lower part thereof, the shape of a cavity (28) which matches, in the housing thereof, the shape of the rod (15) of the obturator element (5).

In this way, the rod (15) of the obturator element and the lower cavity (28) of the body of the key or control (27) of the valve constitute a cotter which unifies the movement of both key or control (27) and obturator (5) joined by way of the positioning washer (23).

Lastly, the key or control (27) of the valve is provided, in turn, with two projections (29) and (30) over the exterior surface thereof, which allows the visual identification, from the exterior, of which outlet channel is in an open or closed position. This is indicated when one of these two projections (29) or (30) matches each one of the two outlet channels (3) or (4), indicating in this way that fluid is circulating through said outlet channel.

The invention claimed is:

1. An improved three-way valve structure comprising a main valve body (1) equipped with an inlet channel (2) and two outlet channels (3, 4) having a quarter turn interior obturator element (5) housed in an interior of the main valve body (1) and manually actuated by a quarter turn of an exterior valve key (27), the cited inlet channel (2) being capable of communicating internally with the outlet channels (3, 4), wherein the outlet channels (3, 4) referred to are arranged perpendicular to each other, both outlet channels (3, 4) being in the same plane perpendicular to the cited inlet channel (2), while the obturator element (5) has a spherical shape; said structure being characterized in that the main valve body (1) ends in a flat face (21) in an upper part thereof, on a surface of which are four indentations (22) distributed crosswise at 90° to each other, on which a positioning washer (23) of the valve key (27) is supported, said positioning washer (23) having a flat shape and four valve operating positions, said positions being established by the connection made between the inlet channel (2) and the outlet channels (3, 4), further comprising at least two diametrically opposing projections (24) and being capable of fitting in the indentations (22) with a flexible joining (25), a shape of a central hole (26) of the positioning washer (23) matching an exterior key seat shape of a rod (15) of the obturator element (5); wherein the valve key (27) adopts, in an interior part thereof, a shape of a cavity (28) which matches, in a housing thereof, the key seat shape of the rod (15) of the obturator element (5); wherein the rod (15) and the cavity (28) constitute a cotter which unifies the movement of both valve key (27) and obturator element (5) joined by way of the positioning washer (23), said positioning washer (23) being fitted around the outer surface of the cavity (28) inside the valve key (27); and wherein the positioning washer (23) and the at least two diametrically opposing projections (24) form a single piece.

2. The improved three-way valve structure according to claim 1, characterized in that an interior structure of the obturator element (5) comprises a longitudinal channel from a lower inlet (6) at a base thereof to an upper bifurcation with two transversal outlet openings (7, 8) both arranged perpendicularly at 90° and in a plane perpendicular to the inlet channel, while the obturator element (5), at an exterior part thereof, is provided, in an upper part thereof, with a protruding flange (9) capable of fitting into an interior recess (14) with similar dimensions in the interior of the main valve body (1) and with two housings (10, 11) of sealing joints (12, 13), the obturator element (5) ending, at the upper end thereof in the protruding rod (15) with the key seat shape that can fit in the valve key (27).

3. The improved three-way valve structure according to claim 1, characterized in that the structure defined in this way enables four functional positions of the valve, established by the connection implemented between the inlet channel (2) and the outlet channels (3, 4), one of the positions being with both outlets open, two positions with only one outlet open and another closed and a final position with both outlets closed by a quarter-circle turn of the valve key (27).

4. The improved three-way valve structure according to claim 1, characterized in that the aforementioned structure has two sealing joints (16, 17) inserted in an interior of each one of the outlet channels (3, 4), inserted pressed against an exterior surface (18) of the obturator element (5), pushed by retaining clips (19, 20) immovable in a radial slot formed in the interior of each one of the outlet channels (3, 4).

5. The improved three-way valve structure according to claim 1, characterized in that the valve key or control (27) is provided in turn with at least two projections (29, 30) and (30) distributed at 90° over the exterior surface thereof for visual and exterior identification of the functional open or closed position of the valve in different positions thereof.

6. The improved three-way valve structure according to claim 1, characterized in that the exterior key seat shape of the rod (15) of the obturator element (5), which matches the shape of the central hole (26) of the positioning washer (23), is not cylindrical.

7. The improved three-way valve structure according to claim 1, characterized in that the central hole (26) of the positioning washer (23) is fitted to rod (15) of the obturator element (5) thereby requiring the positioning washer (23) to rotate when the rod (15) rotates.

* * * * *